United States Patent
Lang et al.

(10) Patent No.: US 7,676,739 B2
(45) Date of Patent: Mar. 9, 2010

(54) METHODS AND APPARATUS FOR KNOWLEDGE BASE ASSISTED ANNOTATION

(75) Inventors: Christian Alexander Lang, New York, NY (US); Ching-Yung Lin, Forest Hills, NY (US); John R. Smith, New Hyde Park, NY (US); Belle L. Tseng, Forest Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 10/723,344

(22) Filed: Nov. 26, 2003

(65) Prior Publication Data

US 2005/0114758 A1 May 26, 2005

(51) Int. Cl.
 *G06F 17/00* (2006.01)
(52) U.S. Cl. .................................................. 715/231
(58) Field of Classification Search ................. 715/500, 715/511, 512, 516, 530, 200, 210, 229, 230, 715/231, 255
 See application file for complete search history.

(56) References Cited

U.S. PATENT DOCUMENTS

| | | | | |
|---|---|---|---|---|
| 5,309,359 A * | 5/1994 | Katz et al. | ................. | 707/102 |
| 5,404,295 A * | 4/1995 | Katz et al. | ..................... | 707/2 |
| 5,867,799 A * | 2/1999 | Lang et al. | ..................... | 707/1 |
| 6,335,738 B1 * | 1/2002 | Englefield et al. | ........... | 715/744 |
| 6,397,181 B1 | 5/2002 | Li et al. | | |
| 6,697,799 B1 * | 2/2004 | Neal et al. | ..................... | 707/3 |
| 6,859,909 B1 * | 2/2005 | Lerner et al. | ................ | 715/203 |
| 6,912,527 B2 * | 6/2005 | Shimano et al. | ................ | 707/7 |
| 6,993,475 B1 * | 1/2006 | McConnell et al. | ........... | 704/7 |
| 6,999,963 B1 * | 2/2006 | McConnell | ................. | 707/100 |
| 7,028,253 B1 * | 4/2006 | Lieberman et al. | .......... | 715/232 |
| 7,212,968 B1 * | 5/2007 | Garner et al. | ............... | 704/251 |
| 2003/0018668 A1 * | 1/2003 | Britton et al. | ............... | 707/513 |
| 2003/0050773 A1 * | 3/2003 | Martinez et al. | ............. | 704/10 |
| 2003/0050994 A1 * | 3/2003 | Pollack | ....................... | 709/217 |
| 2003/0101181 A1 * | 5/2003 | Al-Kofahi et al. | .............. | 707/7 |
| 2003/0120630 A1 * | 6/2003 | Tunkelang | ..................... | 707/1 |
| 2003/0187587 A1 * | 10/2003 | Swindells et al. | ............ | 702/19 |
| 2003/0236845 A1 * | 12/2003 | Pitsos | ........................ | 709/206 |
| 2004/0006456 A1 * | 1/2004 | Loofbourrow et al. | ......... | 704/4 |
| 2004/0024758 A1 * | 2/2004 | Iwasaki | ......................... | 707/3 |
| 2004/0034649 A1 * | 2/2004 | Czarnecki et al. | ........... | 707/102 |

(Continued)

OTHER PUBLICATIONS

M. Erdmann et al., "From Manual to Semi-automatic Semantic Annotation: About Ontology-based Text Annotation Tools," Proceedings of the COLING 2000 Workshop on Semantic Annotation and Intelligent Content, Luxembourg, 7 pages, Aug. 2000.

(Continued)

*Primary Examiner*—Stephen S Hong
*Assistant Examiner*—Gregory J Vaughn
(74) *Attorney, Agent, or Firm*—Anne V. Dougherty; Ryan, Mason & Lewis, LLP

(57) ABSTRACT

Improved document annotation techniques are provided. For example, in one aspect of the invention, a technique for determining an annotation for a document includes the following steps/operations. A user-proposed annotation to be associated with the document is obtained. Then, the technique automatically determines, in accordance with a knowledge base, whether the user-proposed annotation matches at least one allowed annotation.

17 Claims, 6 Drawing Sheets

U.S. PATENT DOCUMENTS

| | | | | |
|---|---|---|---|---|
| 2004/0095936 | A1* | 5/2004 | O'Neill et al. | 370/392 |
| 2004/0110193 | A1* | 6/2004 | Castle et al. | 435/6 |
| 2004/0125148 | A1* | 7/2004 | Pea et al. | 345/802 |
| 2004/0138946 | A1* | 7/2004 | Stolze | 705/14 |
| 2004/0143590 | A1* | 7/2004 | Wong et al. | 707/102 |
| 2005/0027664 | A1* | 2/2005 | Johnson et al. | 706/12 |
| 2006/0026127 | A1* | 2/2006 | Bodlaender | 707/3 |
| 2006/0149708 | A1* | 7/2006 | Lavine | 707/3 |
| 2007/0178473 | A1* | 8/2007 | Chen et al. | 435/6 |

OTHER PUBLICATIONS

S. Handschuh et al., "S-CREAM—Semi-automatic CREAtion of Metadata," 13th International Conference on Knowledge Engineering and Knowledge Management (EKAW02), pp. 1-15, 2002.

C.A. Goble et al., "Describing and Classifying Multimedia Using the Description Logic Grail," SPIE, 15 pages, 1996.

A. Budanitsky, "Semantic distance in WordNet: An experimental, application-oriented evaluation of five measures," Workshop on WordNet and Other Lexical Resources, North American Chapter of the Association for Computational Linguistics, 6 pages, 2000.

* cited by examiner

METHODS AND APPARATUS FOR KNOWLEDGE BASE ASSISTED ANNOTATION

FIELD OF THE INVENTION

The present invention relates to annotation techniques and, more particularly, to knowledge base assisted annotation techniques.

BACKGROUND OF THE INVENTION

Numerous applications require the annotation of documents with a fixed set of terms. Examples include video annotation (where the documents are, for example, key frames of a video) and library cataloging (where the documents are, for example, mainly books and magazines). Examples of annotation terms include "outdoors," "face" and "monologue" for videos, and "antiquities," "meteorology" and "fiction" for library catalogs.

Current annotation systems require the annotator to memorize and pick from a large (typically hierarchical) lexicon of terms. Besides the fact that this is a time-consuming process, lexica keep changing and growing over time, requiring the annotator to keep up-to-date. For example, the Library of Congress introduces close to 1,000 new or changed subject headings each week.

A different approach mainly used for text documents, automatically or semi-automatically finds matching annotations. This is achieved via ontology-based text analysis and machine learning techniques, see, e.g., M. Erdmann et al., "From manual to semi-automatic semantic annotation: About ontology-based text annotation tools," Proceedings of the COLING 2000 Workshop on Semantic Annotation and Intelligent Content, Luxembourg, August 2000. An example of such a system is the S-CREAM system, as described in S. Handschuh et al., "S-CREAM—Semi-automatic CREAtion of Metadata," 13th International Conference on Knowledge Engineering and Knowledge Management (EKAW02), 2002.

However, these techniques can have high annotation error rates that necessitate human supervision, since they do not use a knowledge base in making the annotation decision. On the other hand, approaches such as are described in C. A. Goble et al., "Describing and Classifying Multimedia Using the Description Logic GRAIL," SPIE, 1996, annotate and retrieve documents using a well-defined description logic. Even though this approach improves the retrieval quality, it does not free the document repository maintainer from annotating the documents.

U.S. Pat. No. 6,397,181, entitled "Method and Apparatus for Voice Annotation and Retrieval of Multimedia Data," transforms voice annotations into a word lattice and indexes the word lattice. Even though such an approach tries to simplify the annotation process, the approach focuses on the indexing process and does not try to match the voice annotations with a given set of allowed annotations.

Therefore, a need exists for improved document annotation techniques.

SUMMARY OF THE INVENTION

The present invention provides improved document annotation techniques. For example, in one aspect of the invention, a technique for determining an annotation for a document includes the following steps/operations. A user-proposed annotation to be associated with the document is obtained. Then, the technique automatically determines, in accordance with a knowledge base, whether the user-proposed annotation matches at least one allowed annotation.

The technique may further include the step/operation of notifying the user that the user-proposed annotation does not match at least one allowed annotation, when no match is found. The technique may further include the step/operation of storing a user-proposed annotation/allowed annotation match, when a match is found. The technique may further include the step/operation of notifying the user that the user-proposed annotation matches more than one allowed annotation, when more than one match is found. The technique may further include the step/operation of automatically selecting a match, when more than one match is found. The user may be notified of match results after each attempted matching operation. The user may be notified of match results after a predetermined number of attempted matching operations.

The technique may further include the step/operation of maintaining a history buffer of matches. The history buffer may be used to update a set of allowed annotations. The history buffer may be used to disambiguate matches.

The automatic determining step/operation may further include determining a closeness between the user-proposed annotation and the at least one allowed annotation. The knowledge base may include at least one term graph. Further, the automatic determining step/operation may further include the steps/operations of determining a node in the at least one term graph that corresponds to the user-proposed annotation, determining at least one node in the at least one term graph that corresponds to the at least one allowed annotation, and computing a distance between the nodes. Node determination may include a stemming operation. Still further, the technique may further include annotating the document with the allowed annotation, when a match is found. The same match may also be recalled from storage and the allowed annotation applied, when the user enters the user-proposed annotation again at a later time.

Advantageously, the techniques of the invention reduce the overhead associated with annotating large amounts of documents by humans. It is assumed that a set of allowed annotation terms is given. Instead of having to browse through the full set of allowed annotations, the invention supports the annotator by reducing the possible set of annotations based preferably on closeness of terms and an annotation history.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
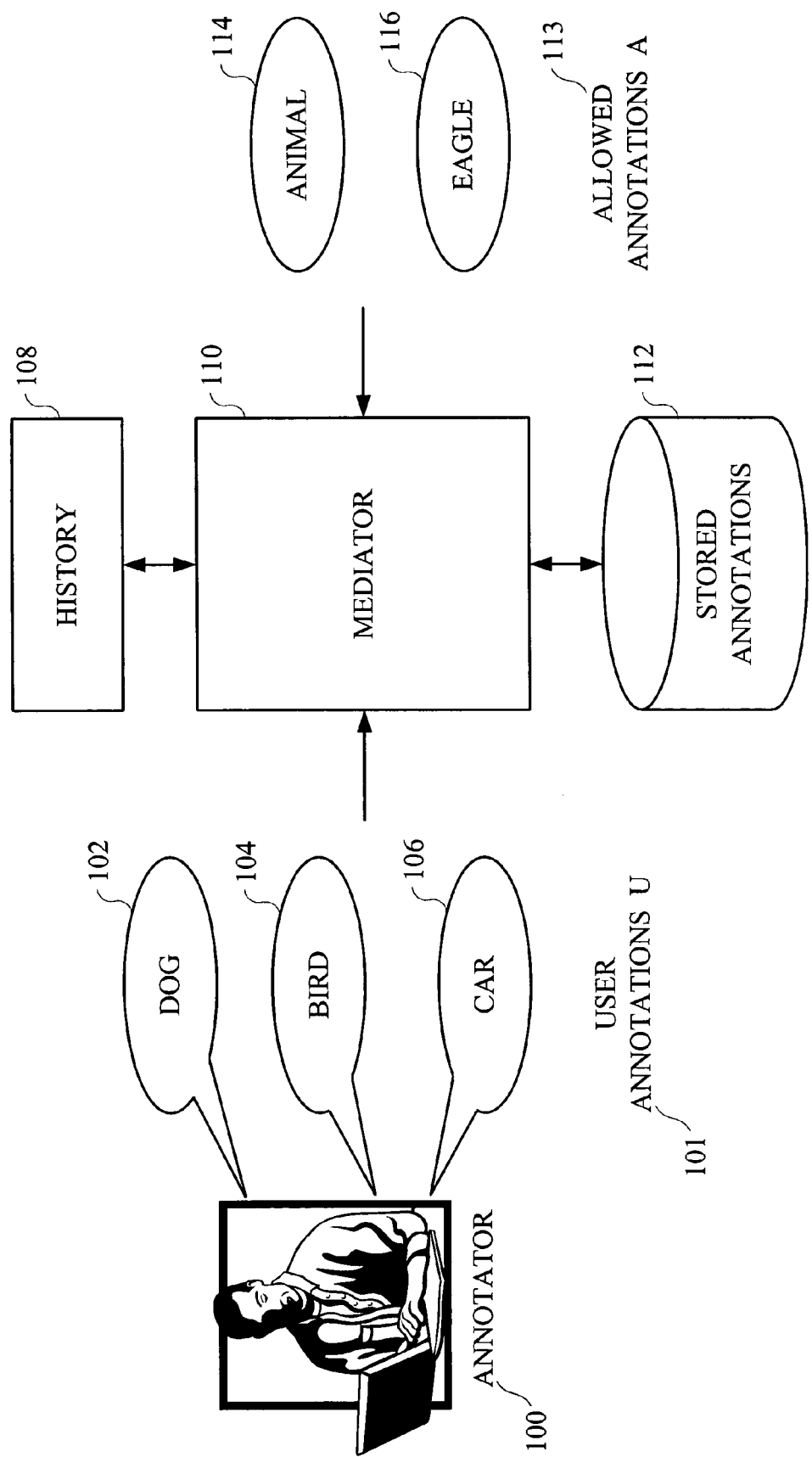
FIG. 1 is a block diagram illustrating a document annotation system according to an embodiment of the invention.

The present invention may be described below, at times, in the context of a text document environment. However, it is to be understood that the invention is not limited to use with any particular environment but is rather more generally applicable for use in accordance with any environment (e.g., library collections, video and/or audio repositories, medical data, retail information, etc.) in which it is desirable to provide effective annotation techniques. Furthermore, the term "document" as used herein generally refers to any single-media or multi-media entity (such as, e.g., a book, a picture, an audio track, a video shot with audio information, a product from retail, a temperature curve for a fixed period of time, etc.) that cannot be further broken into logical subcomponents for the purpose of the annotation task. Similarly, a "collection of documents" refers to multiple such entities that are typically (but do not have to be) of the same type (such as, e.g., a collection of library books, a whole video consisting of multiple video shots, a collection of products offered in a store, etc.).

As will be evident, the techniques of the invention alleviate the above-mentioned and other disadvantages of existing annotation techniques by: (a) keeping the human "in the loop," while (b) eliminating the need to memorize or browse through large lexica. This may generally be achieved as follows. Assume a set A of allowed annotation terms is given. Any term submitted by the annotator (e.g., via keyboard or speech) is looked up in a general knowledge base or dictionary. An example of a freely available lexical database is WordNet from Princeton University. However, any graph-based dictionary supporting at least "is-a"-relationships can be used. In fact, as will be evident, this component can be completely transparent to the user.

Once the term (or its stemmed form) is found in this dictionary, the closest matching term in A is determined. "Closest" may be based on a dictionary graph-structure and will be further defined below. If there is only one such term, this term is used as the annotation. If there are multiple terms, the user has to be presented with a list of possible matches. Note, however, that this list is significantly smaller than a whole lexicon. In practice, it may include only two to three terms. The list can be further reduced by taking history information (i.e., old matches) into account.

One main goal of the invention is to make the annotation process more human-oriented (e.g., based on typed or spoken words rather than lookup in large lists) and efficient (e.g., feedback based on only two to three terms rather than thousands of terms stored in a nested structure).

An example of an application that may employ annotation is a video annotation tool used by feature detectors. Such a tool typically provides a way for the user to watch a video shot by shot. For each shot, the user can then select annotations (such as, e.g., "outdoors setting," "talking person," "animal," "house," etc.). Using existing annotation techniques, the user must select annotations from a large given lexicon. This annotation should capture the essence of the shot and should be as specific as the lexicon allows. Once each video shot is annotated, the annotation information can be used by an automated system to train feature detectors (e.g., for "outdoors," "animal," etc.) with the annotated shots as examples. These detectors can then be used to detect, e.g. "outdoors" or "animal" in other videos as well.

One problem with the above annotation procedure is that the lexicon may be large and nested and thus it may take a long time per shot to perform the annotation. The techniques of the invention allow the user to enter an appropriate term (such as, e.g., "eagle") without having to browse through the lexicon. The techniques of the invention then automatically annotate the shot with the most specific term (e.g., "animal") available in the lexicon.

Referring now to FIG. 1, a block diagram illustrates a document annotation system according to an embodiment of the invention. As shown, the document annotation system includes a user or annotator 100 issuing annotations U 101 (e.g., including the annotations "dog" 102, "bird" 104 and "car" 106), a set A of allowed annotations 113 (e.g., including "animal" 114 and "eagle" 116), a mediator 110 trying to match user annotations U with allowed annotations A by optionally using a history memory 108, and a set of stored annotations S 112. The user annotations can be the result of keyboard entry, spoken words (via speech recognition), or other human input. The allowed annotations are determined by the administrator of the resulting set of annotations or through some standardization (as in the library example). The history memory 108 is a set of term matches (e.g., dog⇔animal, house⇔building, where "⇔" represents a match). The stored annotations can be written to a magnetic storage device, to main memory, or to the screen. The mediator 110 takes as input the user annotations, the history, and the allowed annotations, and generates a set of matched terms as output.

It is to be appreciated that, in one embodiment, data sets A, U and S may be in the form of data streams A, U and S. Thus, the annotation methodology of the invention may also include a method for mapping terms from stream U onto stream S using only terms from stream A.

It is also to be understood that the "document" being annotated is not expressly shown in FIG. 1 as it does not undergo any transformation in the process. It is merely assumed the mediator knows the "identifier" of the document currently shown to the user (and that the mediator can control the "next" document to be shown). The annotation process is an independent task however.

In the example in FIG. 1, the mediator would match the annotation "dog" 102 with "animal" 114 since this is the "closest" match and output "animal" as a stored annotation (output to storage unit 112). If a history memory is used, it would also store dog⇔animal in the history memory 108.

One illustrative instantiation for the mediator may use a term graph (e.g., as derived from an ontology). In this case, the matching process works as follows. For a given user annotation x and a given set of allowed annotations Y, determine the node for x in the given term graph, via word stemming. The "word stemming" operation is used to normalize an input term by reducing it to its stem (e.g., "goes" is transformed into "go," "houses" is transformed into "house," etc.). Systems such as WordNet provide such well-known stemming operations. Then, for each term y in Y, determine the node of y in the same term graph, via stemming. Then, compute the distance between x and y.

One illustrative instantiation for the distance computation is to count links to traverse from x to y. Next, sort all terms y in Y by the computed distances. If there are multiple terms y with the highest score, present them to the user and request feedback, otherwise select the term with the highest score. The selected term is then used to represent x.

The distance or the "closeness" of terms can be defined in different ways. A. Budanitsky, "Semantic Distance in WordNet: An Experimental, Application-oriented Evaluation of Five Measures," Workshop on WordNet and Other Lexical Resources, North American Chapter of the Association for Computational Linguistics, 2000, the disclosure of which is incorporated by reference herein, gives an overview of different semantic-based distance measures for the WordNet system. An example for a very simple distance measure for two terms x and y is the number of links in the "is-a"-graph between x and y. Note that in the case of "is-a", a term can have multiple parents (e.g., "navy is a color" and "navy is a military unit"). The terms closest to a given term are then simply the terms with equal but minimal semantic distance from this term. However, it is to be appreciated that the invention is not limited to a particular matching technique and, therefore, mediator 110 can implement any suitable matching technique without affecting the overall operation of the system.

Figure 2:
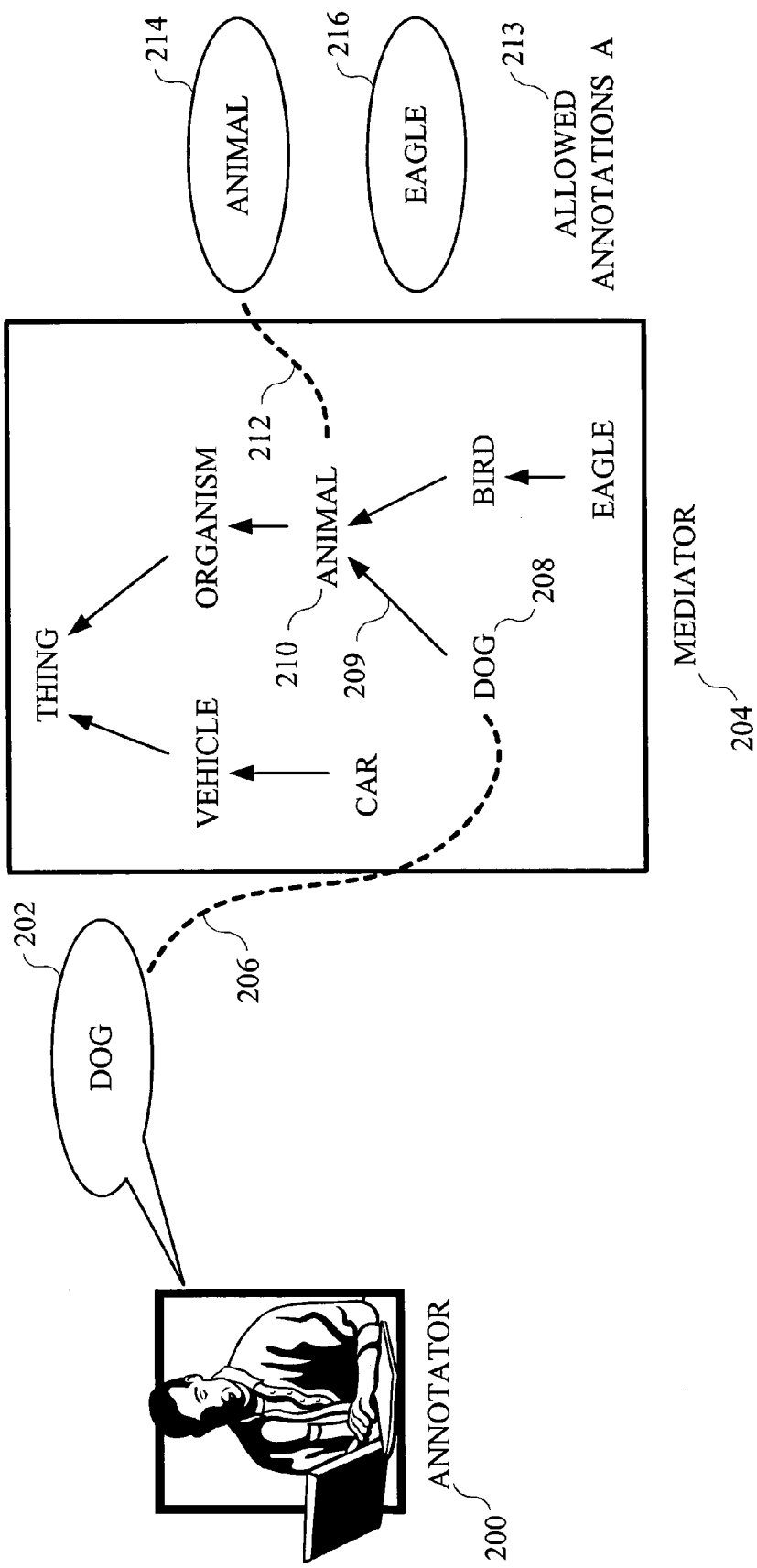
FIG. 2 is a diagram illustrating a single match example of an annotation methodology implemented in a mediator component of a document annotation system according to an embodiment of the invention.

FIG. 2 shows a single match example of the annotation methodology implemented in the mediator component. The example illustrates similar system components as shown in FIG. 1, namely, an annotator 200, annotation "dog" 202, a mediator 204, allowed annotations A 213 (including annotations "animal" 214 and "eagle" 216"). The matching of the user input term "dog" 202 and the allowed annotation "animal" 214 is achieved as follows. First, the node "dog" 208 in the term graph is determined by word stemming. Then, the same happens to find the node "animal" 210. Finally, a match is found by traversing the term graph along edge 209. Note that 206 denotes the action of finding the user annotation in the term graph via stemming and 212 denotes the action of finding the allowed annotation from the term graph via simple string comparison. In fact, 212 may not necessarily be a lookup action as the allowed annotations can also be marked directly in the term graph.

It is to be appreciated that the term graph shown in mediator 204 depicts a simple (or at least a portion of) a knowledge base that may be used to automatically determine annotations in accordance with the invention.

Figure 3:
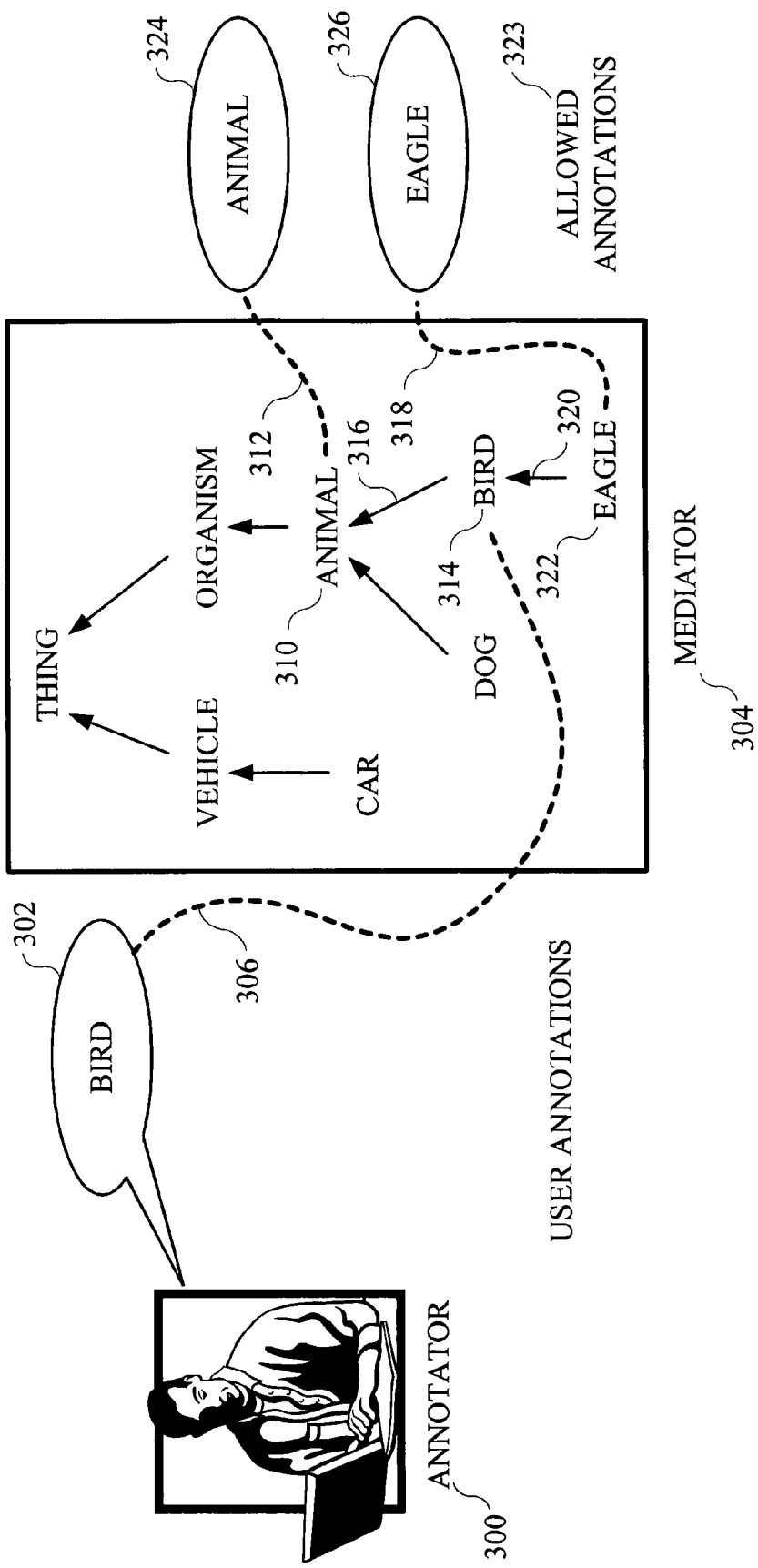
FIG. 3 is a diagram illustrating a multiple match example of an annotation methodology implemented in a mediator component of a document annotation system according to an embodiment of the invention.
Figure 4:
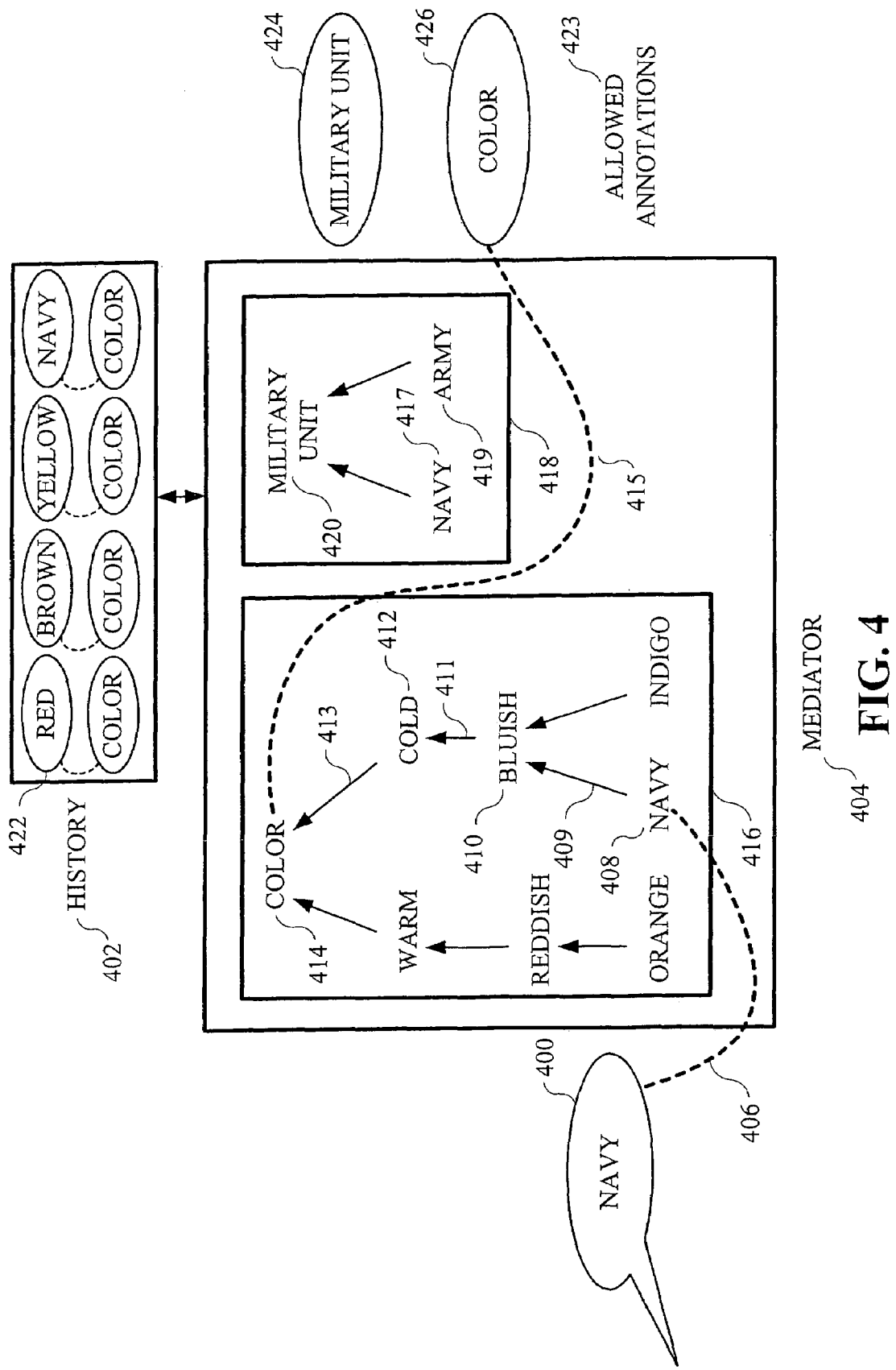
FIG. 4 is a diagram illustrating an example of disambiguation for multiple term graphs using history in an annotation methodology implemented in a mediator component of a document annotation system according to an embodiment of the invention.

Additional examples of knowledge bases (shown in accordance with the mediator component) will be described below in the context of FIGS. 3 and 4.

Figure 5:
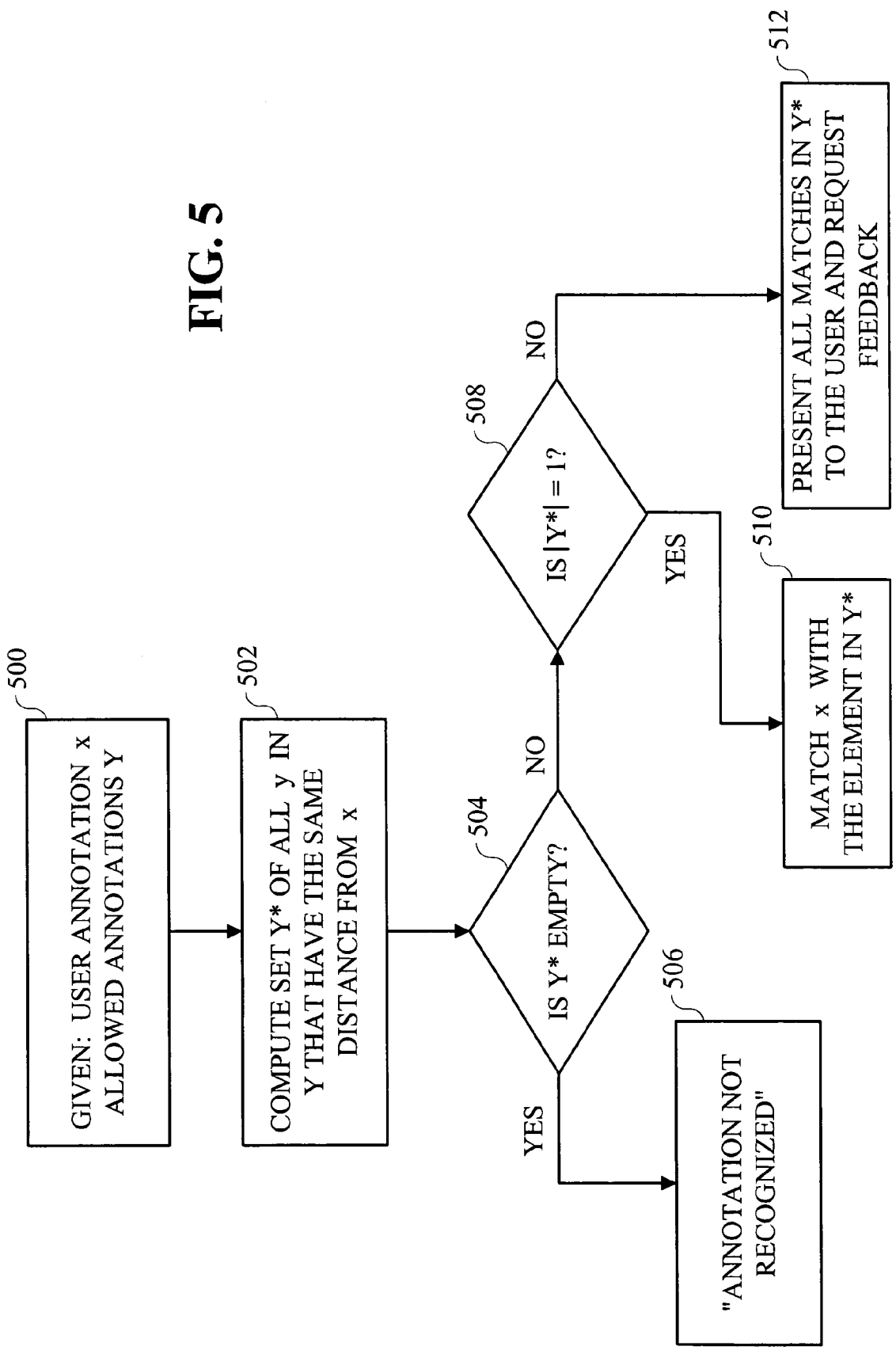
FIG. 5 is a flow diagram illustrating a matching methodology according to an embodiment of the present invention.

FIG. 5 is a flow diagram illustrating a matching methodology according to an embodiment of the present invention. Input to the methodology is user annotation x and allowed annotations Y (step 500). In step 502, the methodology computes a set Y* of all y in Y that have the same distance from x. The set of closest terms can be empty, can contain one element, or can contain multiple elements. If the set is empty (step 504), the term entered by the user is not recognized by the system and can be either discarded or the user is informed and asked to enter a different term (step 506). If the set has cardinality one (step 508), this term is used as the annotation without requiring further user feedback (step 510). If the set contains more than one term, all possible matches are presented to the user who has to pick the best match (step 512).

Returning now to FIG. 3, a multiple match example of the annotation methodology implemented in the mediator component is shown. The example illustrates similar system components as shown in FIG. 1, namely, an annotator 300, annotation "bird" 302, a mediator 304, allowed annotations A 323 (including annotations "animal" 324 and "eagle" 326). More particularly, FIG. 3 shows an example where "bird" 314 can be replaced by both "animal" 310 or "eagle" 322, since both can be reached by traversing one link, i.e., link 316 for "animal" and link 320 for "eagle." Note that 306 corresponds to 206 above and 312/318 correspond to 212 above.

Besides using one single term graph for the mediator, a further illustrative instantiation allows to use multiple term graphs. In this case, the corresponding node for user annotation x has to be determined in all term graphs, via stemming. Similarly, the nodes for the allowed annotations Y have to be determined in all term graphs, via stemming. Next, the distances for all y in Y are computed for each graph. All distances are then merged and the algorithm continues as in the case with one graph.

Furthermore, it is to be appreciated that the invention can operate in an "immediate mode" and in a "batch mode." In immediate mode, the system can request feedback from the user potentially after every matching step. This simplifies context-dependent feedback but it may bias the user to use or avoid certain keywords (once the user saw that "bird" is not an allowed term, she may only use "animal" in subsequent annotations; thus, possible detection of missing allowed terms becomes difficult).

In batch mode, a pre-defined number of user annotations is collected (e.g., for all shots of a video, or one day's batch of library books) and then the user is presented with matching terms for each entered term of the batch. Even though the context may be more difficult to regain in this scenario, the user bias towards certain terms is reduced.

Still further, the invention can operate in an interactive and a non-interactive mode. In interactive mode, the user is prompted for feedback if more than one match is found. In non-interactive mode, one match is automatically selected if more than one match is found. This can be done randomly or based on history information, as described below.

In either mode, user entered terms can be stored together with their match in a history buffer, e.g., history memory 108. The history buffer may typically have limited size and may store the most recent matches. This has at least two advantages. First, the buffer allows determining "hot" and "cold" terms of the allowed annotations A for optimization of A's content. "Hot" terms are terms that are used very often, while "cold" terms are terms that are used very rarely. Second, the buffer aides matching in case of ambiguities.

Hot and cold terms can be used as follows in case of a term graph. By using clustering techniques, a small set of nodes (i.e., terms) can be determined that is closest to the "hot nodes." This set contains potential candidates for additional allowed terms A in the future. Note that while this step is done more or less entirely by humans (e.g., among libraries) in accordance with existing techniques, it is fully automated in accordance with the invention. Note also that at the same time, "cold nodes" can lead to removal of unimportant annotation terms. If this happens, previous user annotations in U have to be revisited to determine the new best matching allowed annotations in the updated set A. By storing which terms from U got translated into which terms from A, this update can be done very efficiently.

The history buffer can be used for disambiguation of matches as follows. Whenever there are multiple allowed terms Y that can be used to match a given user annotation x, a "disambiguation function" $f(x,Y,H)$, with H being the history set, is evaluated. This function returns the element of Y which is most suited to match x based on the history H. One illustrative instantiation of $f$ counts, for each y in Y, all elements $a \Leftrightarrow y$ in H and then returns the y in Y with the highest count.

Returning now to FIG. 4, an example of disambiguation for multiple term graphs using history, in accordance with the annotation methodology implemented in the mediator component, is shown. The example illustrates similar system components as shown in FIG. 1, namely, an annotator (not shown), annotation "navy" 400, a mediator 404, allowed annotations A 423 (including annotations "military unit" 424 and "color" 426") and history buffer 402.

If there is one specialized term graph (416) for color-related terms (408 through 414) and one specialized graph (418) for military terms (417, 419 and 420), the term "navy" 408 may be replaced with "color" 414 in one graph or with "military unit" 420 in the other graph. However, if the user always chose the former replacement, as seen from the history buffer 402, the annotated document is likely about colors. Subsequently, in future replacements within the same document, the color graph may receive a higher priority. In addition, from the fact that there are more "hot spots" within the color-related graph than in the military-related graph, it can be derived that the document is about colors rather than a military topic. This is useful for summarization and/or categorization of the entire document. Note that 406 corresponds to 206 above and 415 corresponds to 212 above. Further, 422 denotes one entry in the history buffer indicating in this example that "red" was previously replaced with "color."

Figure 6:
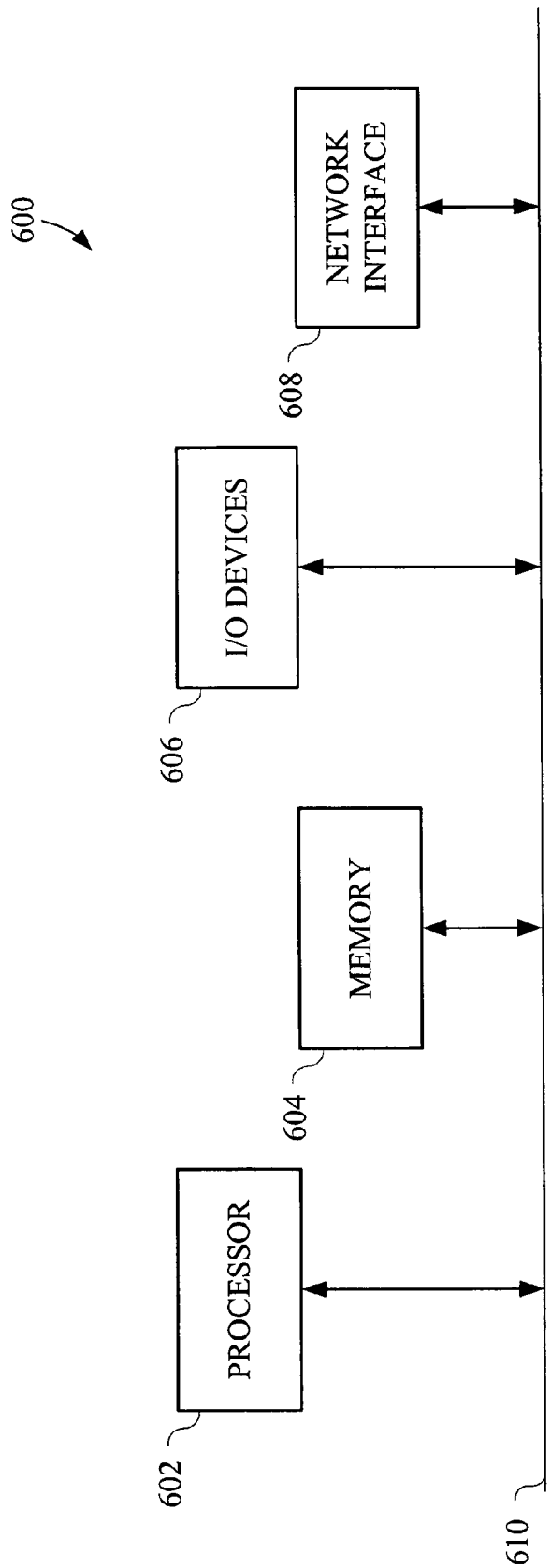
FIG. 6 is a block diagram illustrating a generalized hardware architecture of at least a portion of a computer system suitable for implementing a document annotation system according to an embodiment of the present invention.

Referring lastly to FIG. 6, a block diagram illustrates a generalized hardware architecture of at least a portion of a computer system suitable for implementing a document annotation system according to an embodiment of the present invention. More particularly, FIG. 6 depicts an illustrative hardware implementation of at least a portion of a computer system in accordance with which one or more components/steps of a document annotation system (e.g., components/steps described in the context of FIGS. 1 through 5) may be implemented, according to an embodiment of the present invention. For example, the illustrative architecture of FIG. 6 may also be used in implementing history buffer 108, mediator 110 and/or annotation storage unit 112 (FIG. 1).

Further, it is to be understood that the individual components/steps may be implemented on one such computer system, or more preferably, on more than one such computer system. In the case of an implementation on a distributed system, the individual computer systems may be connected via a suitable network, e.g., the Internet or World Wide Web. However, the system may be realized via private or local networks. The invention is not limited to any particular network.

As shown, the computer system 600 may be implemented in accordance with a processor 602, a memory 604, I/O devices 606, and a network interface 608, coupled via a computer bus 610 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be used to implement the history buffer and the annotation storage.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit. Such I/O devices may be used by the annotator to enter annotations and to receive feedback from the system (e.g., steps 506 and 512 of FIG. 5).

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be further appreciated that the present invention also includes techniques for providing document annotation services. By way of example, a service provider agrees (e.g., via a service level agreement or some informal agreement or arrangement) with a service customer or client to provide document annotation services. That is, by way of one example only, the service provider (in accordance with terms of the contract between the service provider and the service customer) provides document annotation services which may include one or more of the methodologies of the invention described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of determining an annotation for a document, the method comprising the steps of:

obtaining an annotation proposed by a user to be associated with the document;

automatically determining, in accordance with a knowledge base containing allowed annotations, whether the user-proposed annotation matches one or more allowed annotations from the knowledge base; and annotating the document with an allowed annotation from the knowledge base when the user-proposed annotation matches the allowed annotation from the knowledge base;

wherein the user need not consider any annotations when a single allowed annotation is automatically determined to match the user-proposed annotation, and when more than a single annotation is automatically determined to match the user-proposed annotation: (a) in a first mode, the user need only consider the matching allowed annotations and select one of the matching allowed annotations; and (b) in a second mode, the user need not consider any annotations but rather one of the allowed annotations is automatically selected.

2. The method of claim 1, further comprising the step of notifying the user that the user-proposed annotation does not match at least one allowed annotation, when no match is found.

3. The method of claim 1, further comprising the step of storing a user-proposed annotation/allowed annotation match, when a match is found.

4. The method of claim 1, further comprising the step of notifying the user that the user-proposed annotation matches more than one allowed annotation, when more than one match is found.

5. The method of claim 1, wherein the user is notified of match results after each attempted matching operation.

6. The method of claim 1, wherein the user is notified of match results after a predetermined number of attempted matching operations.

7. The method of claim 1, further comprising the step of maintaining a history buffer of matches.

8. The method of claim 7, wherein the history buffer is used to update a set of allowed annotations.

9. The method of claim 7, wherein the history buffer is used to disambiguate matches.

10. The method of claim 1, wherein the automatic determining step further comprises determining a closeness between the user-proposed annotation and the at least one allowed annotation.

11. The method of claim 1, wherein the knowledge base comprises at least one term graph.

12. The method of claim 11, wherein the automatic determining step further comprises the steps of:
    determining a node in the at least one term graph that corresponds to the user-proposed annotation;
    determining at least one node in the at least one term graph that corresponds to the at least one allowed annotation; and
    computing a distance between the nodes.

13. The method of claim 12, wherein node determination comprises a stemming operation.

14. The method of claim 1, wherein the user-proposed annotation is stored, when the user-proposed annotation matches the allowed annotation, such that the user-proposed annotation is useable in a subsequent match operation.

15. Apparatus for determining an annotation for a document, the apparatus comprising:
    a memory; and
    at least one processor coupled to the memory and operative to: (i) obtain an annotation proposed by a user to be associated with the document; and (ii) automatically determining determine, in accordance with a knowledge base containing allowed annotations, whether the user-proposed annotation matches one or more allowed annotations from the knowledge base; and (iii) annotate the document with an allowed annotation from the knowledge base when the user-proposed annotation matches the allowed annotation from the knowledge base;
    wherein the user need not consider any annotations when a single allowed annotation is automatically determined to match the user-proposed annotation, and when more than a single annotation is automatically determined to match the user-proposed annotation: (a) in a first mode, the user need only consider the matching allowed annotations and select one of the matching allowed annotations; and (b) in a second mode, the user need not consider any annotations but rater one of the allowed annotations is automatically selected.

16. An article of manufacture for determining an annotation for a document, comprising a machine readable medium containing one or more programs which when executed implement the steps of:
    obtaining an annotation proposed by a user to be associated with the document;
    automatically determining, in accordance with a knowledge base containing allowed annotations, whether the user-proposed annotation matches one or more allowed annotation from the knowledge base; and
    annotating the document with an allowed annotation from the knowledge base when the user-proposed annotation matches the allowed annotation from the knowledge base;
    wherein the user need not consider any annotations when a single allowed annotation is automatically determined to match the user-proposed annotation, and when more than a single annotation is automatically determined to match the user-proposed annotation: (a) in a first mode, the user need only consider the matching allowed annotations and select one of the matching allowed annotations; and (b) in a second mode, the user need not consider any annotations but rather one of the allowed annotations is automatically selected.

17. A method of providing a service for determining an annotation for a document, comprising the step of:
    a service provider deploying a system operative to: (i) obtain an annotation proposed by a user to be associated with the document; (ii) automatically determine, in accordance with a knowledge base containing allowed annotations, whether the user-proposed annotation matches one or more allowed annotations from the knowledge base; and (iii) annotate the document with an allowed annotation from the knowledge base when the user-proposed annotation matches the allowed annotation from the knowledge base;
    wherein the user need not consider any annotations when a single allowed annotation is automatically determined to match the user-proposed annotation, and when more than a single annotation is automatically determined to match the user-proposed annotation: (a) in a first mode, the user need only consider the matching allowed annotations and select one of the matching allowed annotations; and (b) in a second mode, the user need not consider any annotations but rather one of the allowed annotations is automatically selected.

* * * * *